(12) United States Patent
Saur

(10) Patent No.: US 9,175,745 B2
(45) Date of Patent: Nov. 3, 2015

(54) HANDHELD POWER TOOL HAVING A PLANETARY GEAR

(71) Applicant: Dietmar Saur, Gomaringen (DE)

(72) Inventor: Dietmar Saur, Gomaringen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 13/735,349

(22) Filed: Jan. 7, 2013

(65) Prior Publication Data
US 2013/0178331 A1  Jul. 11, 2013

(30) Foreign Application Priority Data

Jan. 11, 2012  (DE) .......................... 10 2012 200 334

(51) Int. Cl.
*F16H 1/28* (2006.01)
*B25F 5/00* (2006.01)
*B25B 21/00* (2006.01)
*B25B 23/147* (2006.01)

(52) U.S. Cl.
CPC *F16H 1/28* (2013.01); *B25B 21/00* (2013.01); *B25B 23/147* (2013.01); *B25F 5/001* (2013.01); *Y10T 477/33* (2015.01)

(58) Field of Classification Search
CPC ................................ B25B 23/147; F16H 1/28
See application file for complete search history.

(56) References Cited

U.S. PATENT DOCUMENTS 4,231,270 A * 11/1980 Totsu .............................. 81/474
2012/0225748 A1* 9/2012 Michel et al. ................. 475/331

* cited by examiner

*Primary Examiner* — Derek D Knight
(74) *Attorney, Agent, or Firm* — Kenyon & Kenyon LLP

(57) ABSTRACT

In a handheld power tool having a planetary gear, drivable by a motor, for driving a drive shaft in a first or second predefined direction of rotation, the planetary gear being situated in a gear housing and having at least one planetary stage to which an annulus gear situated in the gear housing is assigned, in the area between the annulus gear and the gear housing, at least one sensor element is situated which is designed to enable a detection of a torque which acts in the first or the second direction of rotation and is transferable to the annulus gear via the drive shaft during the operation of the handheld power tool.

14 Claims, 4 Drawing Sheets

ID A HANDHELD POWER TOOL HAVING A
PLANETARY GEAR

CROSS REFERENCE

The present application claims the benefit under 35 U.S.C. §119 of German Patent Application No. DE 102012200334.7 filed on Jan. 11, 2012, which is expressly incorporated herein by reference in its entirety.

FIELD

The present invention relates to a handheld power tool having a planetary gear, drivable by a motor, for driving a drive shaft in a first or second predefined direction of rotation, the planetary gear being situated in a gear housing and having at least one planetary stage to which an annulus gear situated in the gear housing is assigned.

BACKGROUND INFORMATION

Conventional handheld power tools may, for example, be designed as cordless screwdrivers or cordless combi drills and have a planetary gear, situated in an associated gear housing, for driving a drive shaft rotatable in different directions of rotation. The planetary gear may be designed as a single-stage or multi-stage gear and may accordingly have one or multiple annulus gears situated in the gear housing.

The disadvantage of the above is that, in handheld power tools of this type, a kinetic energy of rotation supplied to the drive shaft by the planetary gear may be converted into a rotation of the gear housing and thus of the handheld power tool in the event of extreme load conditions, e.g., in the event of so-called hard screw applications during the operation of cordless screwdrivers or cordless combi drills which may occur during metal screw fittings, for example, and may cause a spontaneous blocking of the drive shaft. This may result in an impact-like load on components of the planetary gear, for example, and thus in them being damaged or destroyed.

SUMMARY

One object of the present invention is to provide a handheld power tool during whose operation extreme load conditions may be detected securely and reliably.

This object may be achieved by an example embodiment of a handheld power tool having a planetary gear, drivable by a motor, for driving a drive shaft in a first or a second predefined direction of rotation. The planetary gear is situated in a gear housing and has at least one planetary stage to which an annulus gear situated in the gear housing is assigned. In the area between the annulus gear and the gear housing, at least one sensor element is situated which is designed to enable a detection of a torque which acts in the first or the second direction of rotation and is transferable to the annulus gear via the drive shaft during the operation of the handheld power tool.

The present invention may thus make it possible to provide a handheld power tool during whose operation extreme load conditions may be detected in a simple manner by using a suitable sensor element and thus measures to be taken with the aid of which the conveyance of excessive kinetic energy of rotation to the gear housing from the drive shaft via a corresponding annulus gear may be prevented.

According to one specific embodiment, the sensor element is situated between the annulus gear and the gear housing in the radial direction of the gear housing. The annulus gear is rotatably fixedly mounted in the gear housing via the sensor element.

In this way, a handheld power tool may be provided in which a direct and rapid detection of corresponding load torques occurring on the gear housing and thus a linear and constant detection of a corresponding torque characteristic are made possible.

On its outer periphery, the annulus gear preferably has a receptacle for accommodating the sensor element at least partially.

Thus, the sensor element may be mounted in a stable and secure manner on the annulus gear.

According to one specific embodiment, the sensor element is situated between the annulus gear and the gear housing in the longitudinal direction of the gear housing, the annulus gear being twistable in the gear housing when acted on by the torque acting in the first or the second direction of rotation.

In this way, a handheld power tool may be provided in which, regardless of a particular direction of rotation of the drive shaft, a reliable detection of corresponding load torques occurring on the gear housing and thus a linear and constant detection of a corresponding torque characteristic are made possible.

The gear housing preferably has a recess for accommodating the sensor element at least partially.

Thus, the sensor element may be mounted in a stable and secure manner on the gear housing.

According to one specific embodiment, the sensor element has a pressure sensor.

The present invention may thus make it possible to provide a simple and cost-effective sensor element.

The sensor element preferably has a piezoelectric element.

The provision of a fail-safe and robust sensor element is thus made possible.

According to one specific embodiment, a control unit is provided which is designed to at least reduce a motor speed generated by the motor during the operation of the handheld power tool, if the sensor element detects a torque acting in the first or the second direction of rotation.

The present invention may thus make it possible to provide a handheld power tool during whose operation a conveyance of excessive kinetic energy of rotation to the gear housing via the drive shaft may be effectively prevented by appropriately controlling the motor speed.

The sensor element is preferably designed to measure a force transferred to the gear housing from the annulus gear via the sensor element when the annulus gear is acted on by the torque acting in the first or the second direction of rotation.

In this way, the provision of a handheld power tool may be made possible during whose operation extreme load conditions may be detected with the aid of a direct and uncomplicated force measurement.

The control unit is preferably designed to at least reduce the motor speed generated by the motor if the transferred force exceeds a predefined threshold value during a predefined time period.

Thus, a handheld power tool may be provided in a simple manner during whose operation a conveyance of excessive kinetic energy of rotation to the gear housing via the drive shaft may be prevented securely and reliably.

BRIEF DESCRIPTION OF THE DRAWINGS

The present invention is explained in greater detail below with reference to the exemplary embodiments illustrated in the figures.

DETAILED DESCRIPTION OF EXAMPLE EMBODIMENTS

Figure 1:
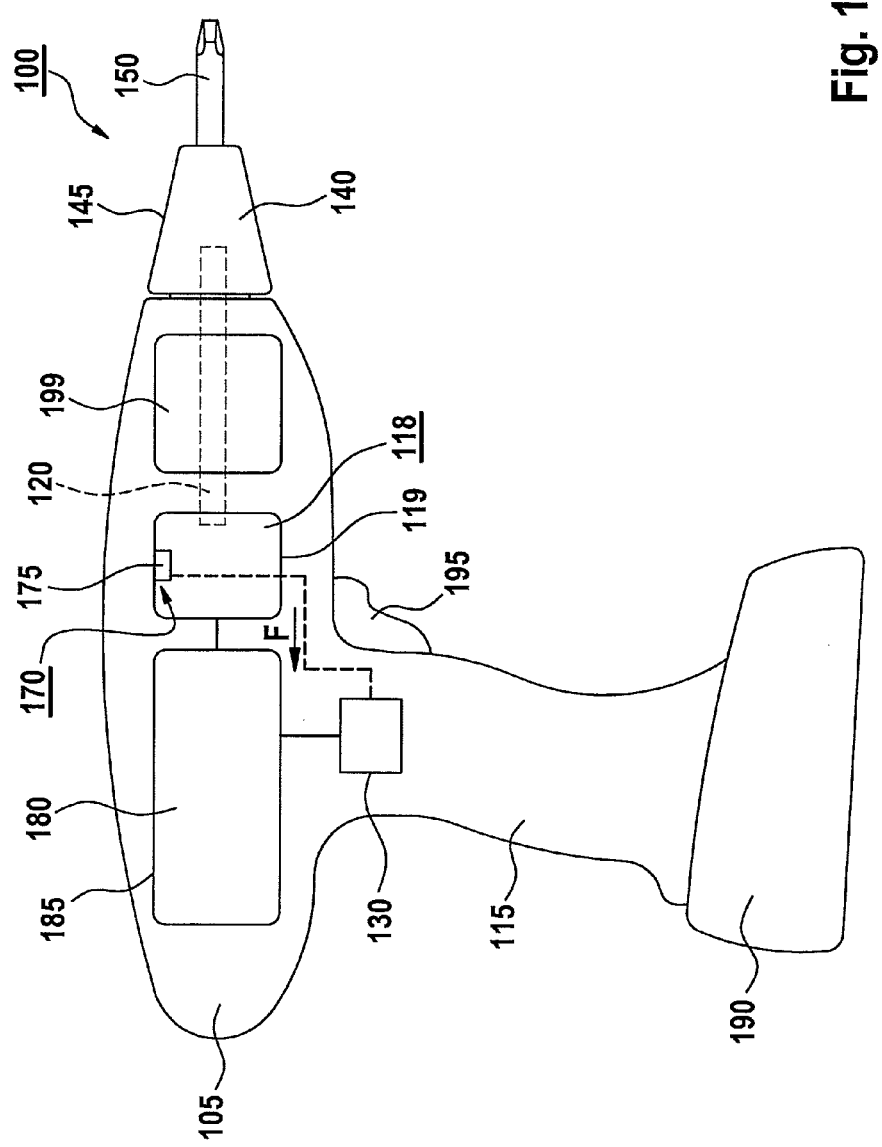
FIG. 1 shows a schematic view of a handheld power tool having a planetary gear according to one first specific embodiment.

FIG. 1 shows an exemplary handheld power tool 100 having a tool housing 105 provided with a handle 115, a tool holder 140 designed for holding an insert tool 150 being situated on this tool housing. According to one specific embodiment, handheld power tool 100 is connectable mechanically and electrically to a battery pack 190 for a mains-independent power supply. In FIG. 1, handheld power tool 100 is designed as a cordless combi drill as an example. Therefore, tool holder 140 has a drill chuck 145 as an example.

It is, however, pointed out that the present invention is not limited to cordless combi drills, but may rather be used with various handheld power tools in which a tool is set into rotation regardless of whether the handheld power tool is mains-operatable or operatable mains-independently using battery pack 190, e.g., with a screwdriver or a cordless screwdriver, a percussion drill, or a cordless percussion drill, etc.

An electric drive motor 180, which is supplied with current from battery pack 190, and a gear 118 are situated in tool housing 105. Drive motor 180 is connected to a drive shaft 120, e.g., a drive spindle, via gear 118. Tool holder 140 may be integrally connected to drive shaft 120 or may be connected thereto in the form of an attachment. During the operation of handheld power tool 100, drive motor 180 rotatably drives drive shaft 120 via gear 118. Drive motor 180 is illustratively situated in a motor housing 185 and gear 118 in a gear housing 119, gear housing 119 and motor housing 185 being situated in tool housing 105 as an example.

Drive motor 180 is, for example, operable via a manual switch 195, i.e., may be switched on and off, and may be any type of motor, e.g., an electronically commuted motor or a DC motor. Drive motor 180 is preferably electronically controllable or regulatable via a control unit 130 which is situated in tool housing 105 and provided for controlling drive motor 180 in such a way that both a reverse operation and input with regard to a desired rotational speed are implementable. The mode of operation and the design of a suitable drive motor are conventional, so a detailed description thereof is dispensed with for the sake of a concise description.

According to one specific embodiment, gear 118 is a reduction gear unit, e.g., a planetary gear having different planetary stages, to which a mechanical torque clutch 199 is optionally assigned. Mechanical torque clutch 199 is designed to mechanically prevent drive shaft 120 from being driven by planetary gear 118 during the operation of handheld power tool 100, for example, by decoupling planetary gear 118 from drive shaft 120, if a torque transferred from drive shaft 120 to planetary gear 118 exceeds a threshold value which may be set by the user of handheld power tool 100.

According to one specific embodiment, at least one sensor element 170 is assigned to planetary gear 118, this sensor element being designed to enable a detection of such a torque transferred to planetary gear 118 via drive shaft 120 during the operation of handheld power tool 100. Sensor element 170 illustratively has a single pressure sensor 175 which, for example, has one or multiple piezoelectric elements and is connected to control unit 130, as an example. This control unit is at least designed to at least reduce a motor speed generated by motor 180 during the operation of handheld power tool 100, if sensor element 170 detects a torque transferred to planetary gear 118 via drive shaft 120 during the operation of handheld power tool 100. For this purpose, sensor element 170 is able to measure a force transferred to gear housing 119 due to the fact that planetary gear 118 is acted on by such a torque and it may transmit a corresponding measuring signal F to control unit 130, as described below for FIGS. 2 and 3.

It is, however, pointed out that the description of the use of a single pressure sensor 175 is an example only and is not to be construed as a limitation to the present invention. The present invention may rather be implemented using two or more pressure sensors, as described for FIG. 6 as an example.

Figure 2:
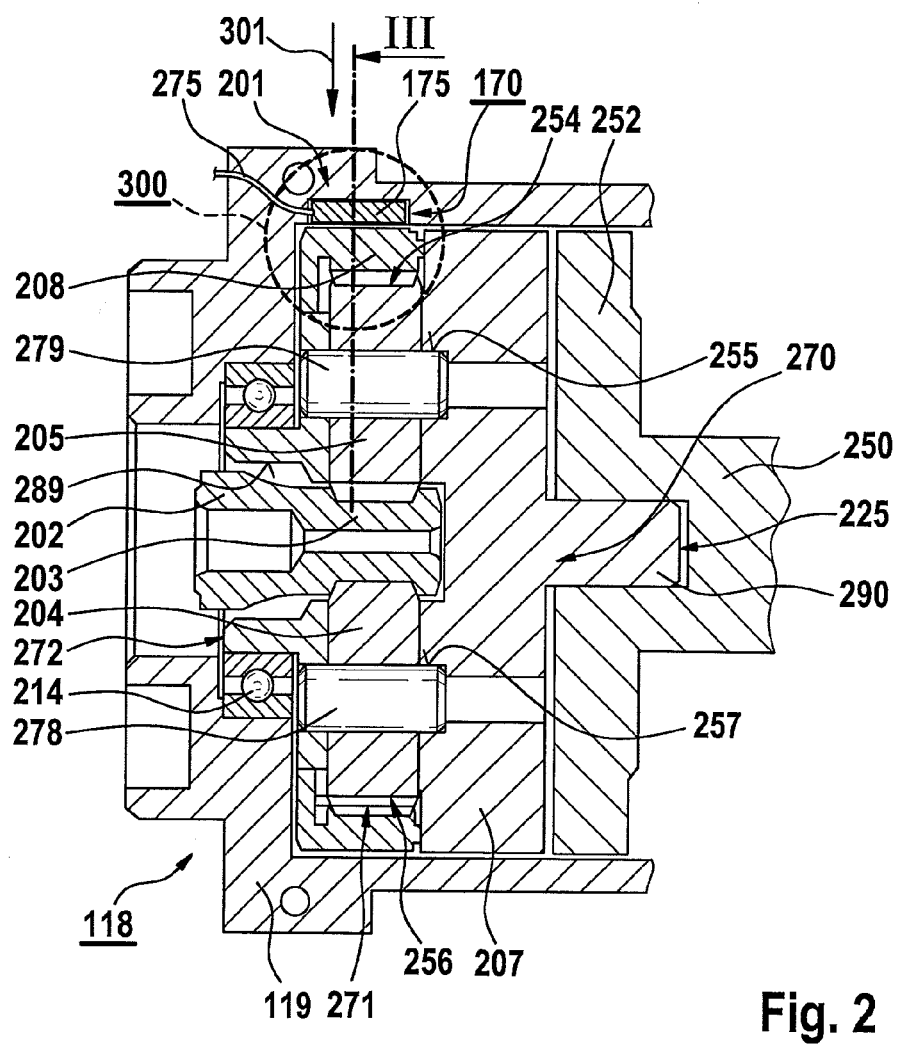
FIG. 2 shows an enlarged sectional view of a section of the planetary gear of the handheld power tool of FIG. 1.

FIG. 2 shows a section of planetary gear 118 of FIG. 1, which is provided with gear housing 119 and has sensor element 170 of FIG. 1 situated in gear housing 119. This sensor element has pressure sensor 175 of FIG. 1 as an example.

Illustratively, planetary gear 118 has a single planetary stage 201 including a sunwheel 203, planetary wheels 204, 205, an annulus gear 208, and a planet carrier 207. Sunwheel 203 is drivable by a drive element 202 which is rotatably fixedly or integrally connected to a motor shaft associated with drive motor 180 from FIG. 1 or which may be designed in one piece with it. Sunwheel 203 and drive element 202 are preferably also designed in one piece.

Planet carrier 207 is illustratively designed as an integral part of an exemplary drive member 225, planet carrier 207 forming a front area 270 of drive member 225 according to one specific embodiment. This front area 270 is designed in the form of a plate and flange-like, as an example. On an axial side of front area 270, on the right-hand side in FIG. 2, a journal 290 is formed, and on the opposite axial side, on the left-hand side in FIG. 2, front, flange-like area 270 becomes a central cylinder-shaped area 271. In this central area 271, radial recesses 254, 256 are provided, as an example, to accommodate planetary wheels 205 and 204, respectively. Illustratively, they are rotatably mounted on associated bearing bolts 278, 279 which are fixed in, e.g., pressed into, cylinder-shaped openings 257 and 255 provided in central area 271. According to one specific embodiment, central area 271 becomes a rear, annular area 272 which is illustratively rotatably mounted in a rolling bearing 214, e.g., a ball bearing, situated in a gear housing 119, and forms a hollow space 289 for accommodating sunwheel 203 and drive element 202.

Drive element 225 or its journal 290 is provided for rotatingly driving a drive body 250 and is rotatably fixedly connected thereto, e.g., pressed in, glued or welded, for this purpose. According to one specific embodiment, drive body 250 is rotatably fixedly or integrally connected to drive shaft 120 of FIG. 1 or may be designed in one piece with it.

According to one specific embodiment, pressure sensor 175 of sensor element 170 is situated in the area between annulus gear 208 and gear housing 119. Illustratively, pressure sensor 175 is situated in the radial direction of gear housing 119 between annulus gear 208 and gear housing 119 in such a way that annulus gear 208 is rotatably fixedly connected to gear housing 119 via pressure sensor 175. Moreover, pressure sensor 175 is connected to control unit 130 of FIG. 1 via flexible lines 275 associated with sensor element 170 to enable a signal transmission from sensor element 170 to control unit 130.

Figure 3:
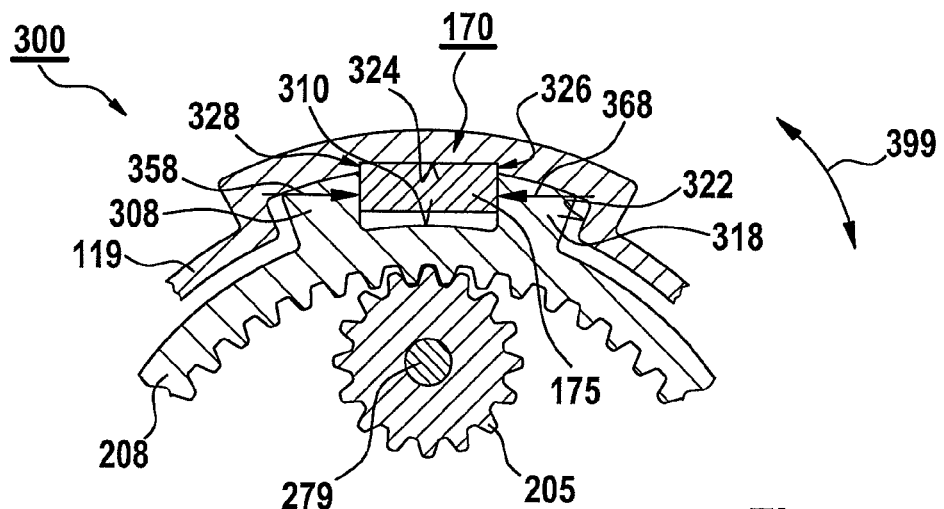
FIG. 3 shows a sectional view of a section of the planetary gear of FIG. 2, viewed in the direction of an arrow III of FIG. 2.

FIG. 3 shows a cut section 300 of the system of FIG. 2 including planetary wheel 205 which is rotatably mounted on bearing bolt 279; annulus gear 208, which is shown partially and is designed according to one first specific embodiment; sensor element 170; and gear housing 119, which is shown partially and is also designed according to one first specific embodiment. Sensor element 170 has pressure sensor 175 of FIG. 2, as an example, which is situated between annulus gear 208 and gear housing 119 in the radial direction of gear housing 119 and via which annulus gear 208 is rotatably fixedly mounted in gear housing 119 according to one specific embodiment, as described in the following.

On its outer periphery, annulus gear 208 illustratively has a receptacle 310 for accommodating sensor element 170 at least partially. This receptacle 310 is, for example, formed by two extensions 308, 318 of annulus gear 208 which point radially outward. Extensions 308, 318 engage, as an example, into an indentation 322 directed radially outward on gear housing 119, the dimensions of indentation 322 being predefined viewed in the peripheral direction of annulus gear 208 in such a way that a connection is created between annulus gear 208 and gear housing 119 which is subject to a clearance formed within predefined tolerances.

According to one specific embodiment, pressure sensor 175 of sensor element 170 is accommodated at least partially in receptacle 310. In this way, a generally clearance-free, preferably form-locked connection is formed between pressure sensor 175 and annulus gear 208. Moreover, pressure sensor 175 engages starting from receptacle 310 at least partially in a radially outward manner into a recess 324 which is provided with two shoulders 326, 328 on gear housing 119 and which is formed in indentation 322 as an example. In this case, the dimensions of receptacle 310 and indentation 324 viewed in the peripheral direction of annulus gear 208 at least generally correspond to the dimensions of pressure sensor 175 so that an at least generally clearance-free, preferably form-locked connection is also formed between pressure sensor 175 and gear housing 119 of handheld power tool 100 of FIG. 1.

During the operation of handheld power tool 100 of FIG. 1, a torque may be transferred to planetary gear 118 of FIGS. 1 and 2 via drive shaft 120 of FIG. 1 in the event of an extreme load condition, e.g., in the event of a hard screw application, as described above. Due to this transferred torque, a kinetic energy of rotation is introduced into annulus gear 208 via planetary wheel 205, which may result in a rotation of annulus gear 208 into a first or a second direction of rotation depending on the torque, the direction of rotation being identified by an arrow 399, for example. As a function of the particular direction of rotation 399, annulus gear 208 transfers via pressure sensor 175 a force to shoulder 326 or 328 provided on gear housing 119, which is identified either by an arrow 358 or an arrow 368 and which in turn may result in a rotation of gear housing 119 in the particular direction of rotation 399. To prevent this from happening, transferred force 358, 368 is measured by pressure sensor 175 and a corresponding measuring signal (F in FIG. 1) is transmitted to control unit 130 of FIG. 1.

Control unit 130 of FIG. 1 evaluates the measuring signal (F in FIG. 1) and reduces the motor speed generated by the drive motor (180 in FIG. 1), for example, if transferred force 358, 368 exceeds a predefined threshold value in a predefined time period, or if the transferred torque increases comparably rapidly and greatly in the predefined time period. Such a reduction may, for example, be achieved by a suitable pulse width modulation of a motor current supplied to the drive motor (180 in FIG. 1) or by an active braking action of the drive motor. According to one specific embodiment, the predefined threshold value is lower than a minimum threshold value which is predefinable by the user, as described in FIG. 1, for optional, mechanical torque clutch 199 of FIG. 1.

Figure 4:
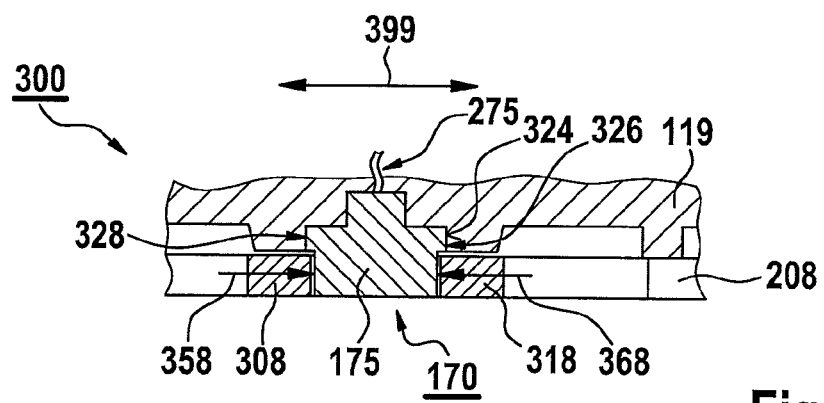
FIG. 4 shows a top view of the section of FIG. 3, viewed in the direction of an arrow 301 of FIG. 2.

FIG. 4 shows section 300 of FIG. 3 in a top view to illustrate the at least essentially clearance-free, preferably form-locked connection between pressure sensor 175 and annulus gear 208 on the one hand, and pressure sensor 175 and gear housing 119 on the other hand.

Figure 5:
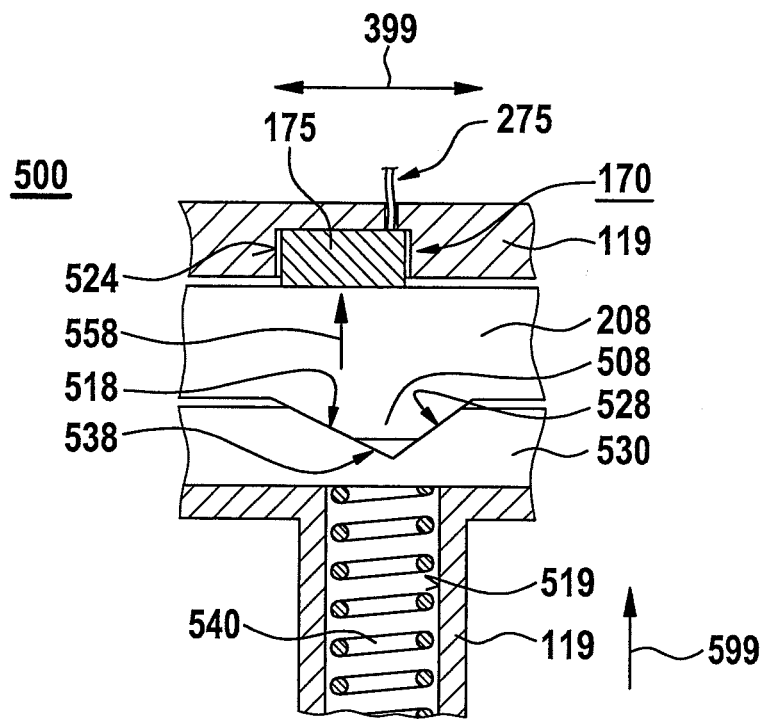
FIG. 5 shows a top view of a section of the planetary gear of FIGS. 1 and 2 designed according to one second specific embodiment.

FIG. 5 shows a system 500 having an exemplary section of planetary gear 118 of FIGS. 1 and 2 which illustratively has a section of annulus gear 208 of FIG. 2 designed according to one second specific embodiment and of gear housing 119 of FIGS. 1 and 2 on which sensor element 170 having one single pressure sensor 175 of FIG. 1 and flexible lines 275 of FIG. 2 are situated as an example between annulus gear 208 and gear housing 119 in longitudinal direction 599 of gear housing 119. Moreover, a cam disk 530 is illustratively situated radially fixedly but axially shiftably in longitudinal direction 599 between annulus gear 208 and gear housing 119. This cam disk is acted on in longitudinal direction 599 against annulus gear 208 by a spring element 540, as an example, which is designed as a pressure spring and is mounted in an axially oriented opening 519 of gear housing 119. The annulus gear is, as described below, twistable in first or second direction of rotation 399 of FIG. 3 in gear housing 119 when acted on by the torque transferred to planetary gear 118 of FIGS. 1 and 2 via drive shaft 120 of FIG. 1.

It is, however, pointed out that the description of cam disk 530 being acted on against annulus gear 208 with the aid of a pressure spring is an example only and is not to be construed as a limitation to the present invention. It may rather also be implemented in that the spring acts on annulus gear 208 against cam disk 530, for example. Moreover, any other suitable spring element may also be used instead of the pressure spring.

According to one specific embodiment, annulus gear 208 has in the axial direction on its side facing cam disk 530 an axial extension 508, which is provided with two bevels 518, 528.

This extension engages into an illustratively V-shaped axial recess 538 which is formed in the axial direction of cam disk 530 on its side facing annulus gear 208.

If, during the operation of handheld power tool 100 of FIG. 1, as described above, a torque is transferred to planetary gear 118 of FIG. 1 via drive shaft 120 of FIG. 1 in the event of an extreme load condition, annulus gear 208 may twist in first or second direction of rotation 399. In this case, one of bevels 518, 528 of axial extension 508 slides as a function of the particular direction of rotation 399 along V-shaped recess 538 in the particular direction of rotation 399. This results in a shift of annulus gear 208 in longitudinal direction 599 of gear housing 119 so that a force identified by an arrow 558 and directed onto pressure sensor 175 is generated in longitudinal direction 599, the force being proportional to the transferred torque and thus evaluatable by control unit 130 of FIG. 1, as described for FIG. 3.

Figure 6:
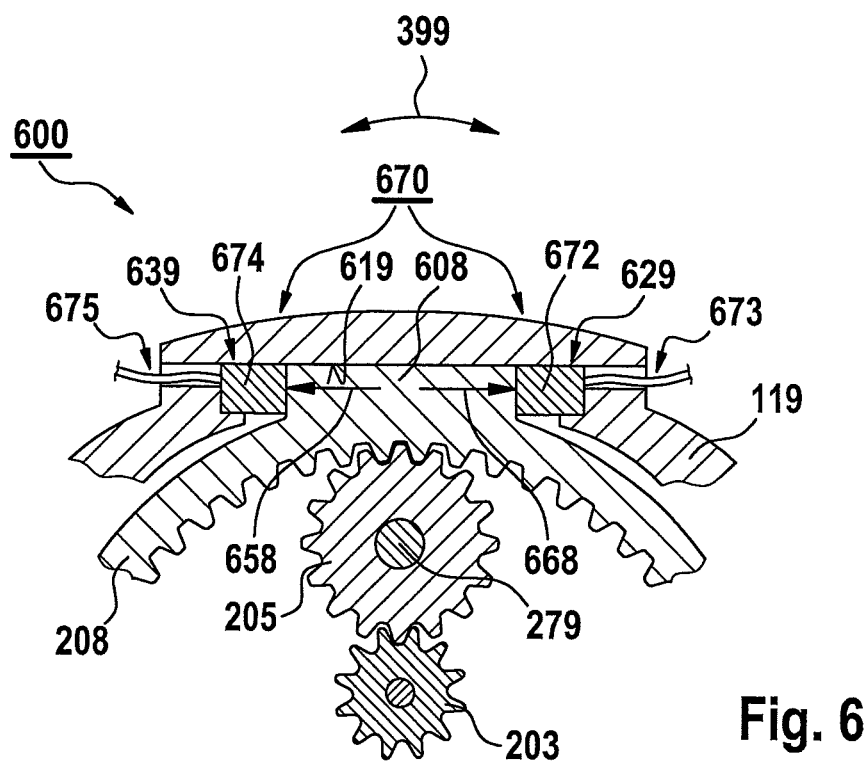
FIG. 6 shows an enlarged sectional view of a section of the planetary gear of FIGS. 1 and 2 designed according to one third specific embodiment.

FIG. 6 shows a section 600 of planetary gear 118 of FIG. 2 including sunwheel 203, planetary wheel 205, which is driven thereby and is rotatably mounted on bearing bolt 279, as well as annulus gear 208, designed according to one third specific embodiment, and gear housing 119 between which a sensor element 670 is situated as an example. Sensor element 670 has two pressure sensors 672, 674 as an example which are situated in an indentation 619 directed radially outward on gear housing 119.

Pressure sensors 672, 674 are illustratively connected via associated flexible lines 673 and 675, respectively, to control unit 130 of FIG. 1 and are situated at least partially in recesses 629 and 639 of indentation 619 which are formed on indentation 619 viewed in the peripheral direction of gear housing 119. Pressure sensors 672, 674 are, as an example, spaced apart from one another at a predefined distance into which extension 608 of annulus gear 208, directed radially outward, for example, engages in such a way that annulus gear 208 is rotatably fixedly mounted in gear housing 119 via pressure sensors 672, 674.

When annulus gear 208 is acted on by a torque acting in first or second direction of rotation 399 of FIGS. 3 through 5, as described above for FIGS. 3 and 5, it applies a force to one of pressure sensors 674 or 672 in the respective direction of rotation 399 in the direction of an arrow 658 or in the direction of an arrow 668. This force may be detected and further processed, as described for FIGS. 3 and 5.

What is claimed is:

1. A handheld power tool, comprising:
   a motor;
   a gear housing;
   an annulus gear situated in the gear housing;
   a planetary gear drivable by the motor to drive a drive shaft in a first or second predefined direction of rotation, the planetary gear being situated in the gear housing and having at least one planetary stage to which the annulus gear is assigned;
   at least one sensor element situated in an area between the annulus gear and the gear housing in the longitudinal direction of the gear housing, the at least one sensor element being configured to detect a torque which acts in the first or the second direction of rotation and is transferable to the annulus gear via the drive shaft during operation of the handheld power tool;
   a cam disk situated radially fixedly and axially shiftably in the longitudinal direction between the annulus gear and the gear housing, wherein the annulus gear has in the longitudinal direction on its side facing the cam disk an axial extension that engages into an axial recess formed in the longitudinal direction of the cam disk on its side facing the annulus gear; and
   a control unit configured to at least reduce a motor speed generated by the motor during operation of the handheld power tool if the sensor element detects a torque acting in the first or the second direction of rotation, wherein the control unit is configured to receive and evaluate a signal transmission from the at least one sensor element, wherein based on the evaluation, the control signal is configured to at least reduce the motor speed generated by the motor if a transferred force exceeds a predefined threshold value during a predefined time period.

2. The handheld power tool as recited in claim 1, wherein the sensor element is situated between the annulus gear and the gear housing in a radial direction of the gear housing, and the annulus gear is rotatably fixedly mounted in the gear housing via the sensor element.

3. The handheld power tool as recited in claim 2, wherein the annulus gear has a receptacle on an outer periphery for accommodating the sensor element at least partially.

4. The handheld power tool as recited in claim 3, wherein the gear housing has a recess for accommodating the sensor element at least partially.

5. The handheld power tool as recited in claim 1, wherein the sensor element is situated between the annulus gear and the gear housing in the longitudinal direction of the gear housing, and the annulus gear is twistable in the gear housing when acted on by the torque acting in the first or the second direction of rotation.

6. The handheld power tool as recited in claim 1, wherein the sensor element includes a pressure sensor.

7. The handheld power tool as recited in claim 1, wherein the sensor element includes a piezoelectric element.

8. The handheld power tool as recited in claim 1, wherein the sensor element is configured to measure the force transferred to the gear housing from the annulus gear via the sensor element when the annulus gear is acted on by the torque acting in the first or the second direction of rotation.

9. The handheld power tool as recited in claim 1, wherein the cam disk is acted on in the longitudinal direction against the annulus gear by a spring element.

10. The handheld power tool as recited in claim 9, wherein the spring element is mounted in an axially oriented opening of the gear housing.

11. The handheld power tool as recited in claim 1, wherein the annulus gear is acted on in the longitudinal direction against the cam disk by a spring element.

12. The handheld power tool as recited in claim 11, wherein the spring element is mounted in an axially oriented opening of the gear housing.

13. The handheld power tool as recited in claim 1, wherein the axial extension is provided with two bevels.

14. The handheld power tool as recited in claim 1, wherein the axial recess is V-shaped.

* * * * *